Patented Oct. 6, 1936

2,056,540

UNITED STATES PATENT OFFICE 2,056,540

PROCESS FOR TREATING SALT TO PREVENT HARDENING OR CAKING AND RESULTING PRODUCT

Marnell Segura, Jefferson Island, La., assignor to Jefferson Island Salt Mining Company, Louisville, Ky., a corporation of Delaware No Drawing. Application August 27, 1935, Serial No. 38,133

6 Claims. (Cl. 23—239)

This invention relates to salt and its manufacture, and more particularly to a process for preparing salt so as to prevent the hardening or caking thereof during storage and to the product resulting from such a process.

As is well known, salt, due to its solubility in water and hygroscopic character under ordinary conditions, exhibits a marked tendency to harden or cake upon drying out during storage. In order to prevent or minimize this phenomenon, it has previously been proposed to mix with salt certain water-insoluble substances which tend to maintain the salt in freely flowable condition, the substances most commonly used by salt manufacturers today being magnesium carbonate, calcium carbonate and tri-calcium phosphate. However, the use of any of these substances in the amounts necessary to inhibit caking or hardening adversely affects the mineral purity of the salt and imparts to brine solutions made therefrom a cloudy or turbid condition.

It is therefore one of the objects of the present invention to provide a novel process for preparing salt which effectively prevents the hardening or caking thereof during storage and which produces a salt containing no added substances which are insoluble in water.

Another object is to provide a new and improved process for treating salt which maintains the latter in a thoroughly friable condition under extreme as well as ordinary atmospheric conditions and which also prevents complete dehydration of the salt by whatever natural drying may occur during storage.

A further object is to provide a method of preparing salt to prevent its hardening which has no deleterious effect upon the salt, particularly as an article of food, and which enhances its value for certain purposes, such as the curing of meat by maintaining it in slightly moist condition, the salt thereby adhering more readily when applied to meat.

Still another object is to provide a process of this character which is extremely simple in its procedural steps, requires no complicated or expensive equipment for its performance, and produces a superior product at no substantial increase in cost over methods now known to the art intended for analogous purposes.

A still further object is to provide as an article of commerce a non-caking salt of novel composition which is substantially free from mineral impurities and substances insoluble in water and tends to remain in slightly moist condition even when stored in a relatively dry atmosphere.

These and other objects will appear more fully upon a consideration of the description of the invention which follows.

I have discovered that a mere mechanical mixing of a suitable quantity of glycerin with salt, particularly those grades known as evaporated vacuum pan salt, grainer or flake salt and smoke salt, will result in a product which will not harden or cake but will remain in loose, slightly moist condition during any normally expected period of storage even under extreme atmospheric conditions. Salt is only slightly soluble in glycerin, and the mixture of the two substances appears to produce a film which effectually withstands variations in weather conditions and prevents the hardening of the salt which would otherwise occur in the absence of the glycerin. Inasmuch as glycerin is an excellent dehydrating agent, it prevents the driving off from the salt of all of its moisture and thereby maintains the salt in a slightly moist condition, a characteristic which is especially valuable for salt intended for such purposes as the curing of meats and other substances.

Since glycerin is an alcohol resulting from the hydrolysis of a fatty substance and perfectly miscible with water, the addition of glycerin to salt does not adversely affect the mineral purity thereof or increase the percentage of materials insoluble in water as determined by chemical analysis, nor does it result in a cloudy or turbid solution when the salt is dissolved in water. Glycerin is odorless, tasteless and non-poisonous, and, so far as is now known, its use in salt will have no deleterious effect when the salt is used in or on foodstuffs of any character. Inasmuch as glycerin is not appreciably volatile or subject to evaporation at ordinary temperatures, and is also unaffected by low temperatures, its mixture with salt results in a product which remain stable under all conditions which might be encountered during storage, providing the moisture content of the salt when packed is less than ½ of 1%.

In treating salt according to the invention, I have found that the amount of glycerin which should be mixed with the salt may be varied from about 1/20 of 1% up to about 3% by weight of the salt, the most economical and efficacious results appearing to be obtained by the use of glycerin in amounts ranging from about $\frac{1}{10}$ of 1% to 1%. If less than about 1/20 of 1% of glycerin is used, it is ineffective to prevent hardening or caking, while any quantity larger than about 3% not only fails to effect any increase in the desirable characteristics of the mixture but also may render the salt too moist. An excessive amount of glycerin would also make the process too expensive for practical, commercial usage.

As one example of the application of the present invention, the following description of the treatment of evaporated vacuum pan, or grainer salt may be considered as illustrative. The salt is first treated in a rotary kiln dryer under definitely controlled drying conditions until it is brought to a bone-dry condition containing not more than about ¼ of 1% moisture. Under normal conditions the temperature of the salt at the discharge end of the rotary dryer is approximately 300° F. The salt is next cooled to a temperature of about 140° F. at which time it is transferred to a batch mixer of any suitable type ready for the addition of the glycerin. The glycerin is then added to the salt in an amount equal to approximately $\frac{1}{10}$ of 1% by weight of the salt, and the two substances are mechanically mixed for a sufficient length of time to effect thorough distribution of the glycerin throughout the mass of the salt. Upon completion of the mixing operation, the glycerinated salt is transferred by a suitable conveyor to a bin wherein it is stored until withdrawn for packaging.

With one type of mixing equipment available on the market, it has been found that best results are obtained by using a batch of 200 pounds of salt and ⅕ of a pound of glycerin, although it will be appreciated that with other forms of mixing apparatus the size of the batch may be varied. Likewise, the amount of glycerin which is added to the salt may vary from as little as 1/20 of 1% to approximately 1% when treating either vacuum pan or grainer salt, dependent upon the desired condition of the salt and the atmospheric conditions to which it will be subjected during storage, although under average conditions $\frac{1}{10}$ of 1% will be adequate. With some kinds of salt the proportion of glycerin may be greater, running as high as about 3%. For example, in the manufacture of smoke salt intended for the curing of meat at least 1% of glycerin is necessary to provide the moist, damp condition required by the trade in this grade of salt.

By mixing the glycerin with the salt at a temperature of between 125° and 140° F. the intimacy of the mixture is definitely enhanced since the heat of the salt under these conditions reduces the viscosity of the glycerin; at the same time, there is no danger of evaporation which would be liable to occur were the mixing to take place at the temperature at which the salt is discharged from the rotary kiln dryer.

There is thus provided by the present invention a novel yet extremely simple process of treating salt in such a way as to effectually prevent its hardening or caking during storage. The salt produced by this process is minerally pure, contains no added constituents which are insoluble in water or which in any way adversely affect the character of the salt, particularly for use in food stuffs, and, because of its increased capability for remaining slightly moist, is particularly well adapted for such purposes as curing where it is desired that the salt adhere to the meat or other substance being treated. Inasmuch as the process requires only a mechanical mixing of the salt and glycerin, it can be easily carried out by the use of mixing equipment well known to the industry. Likewise, the glycerin required for the process is readily available on the open market in chemically pure form. The physical and chemical characteristics of glycerin are such as to make it an excellent agent for use in the process of the invention, while the quality of the resulting product is likewise enhanced by these same characteristics. The process is simple, economical and more effective in its results than any of the similar procedures hitherto known, and the product thereof possesses non-hardening and other qualities which render it a distinct improvement over the treated salts now on the market.

Although one example of the present process has been described in detail, including the specification of certain preferred proportions of the salt and glycerin, it will be understood that the invention is capable of embodiment in specifically different procedural steps and that the amount of glycerin used may be varied within the range from about 1/20 of 1% to about 3% dependent upon the kind of salt being treated, the purposes for which the salt is to be used and the expected conditions of storage. Likewise, it is apparent that the mixing of the glycerin with the salt may be accomplished in other ways than in a mechanical mixer of the batch type, as, for example, by depositing the glycerin upon the salt in atomized form. Various other changes, which will now become apparent to those skilled in the art, may be made in the details of the process and in the specific character of the product without departing from the spirit of the invention. Reference is therefore to be had to the appended claims for a definition of the limits of the invention.

What is claimed is:

1. A process for treating salt to prevent its hardening or caking consisting of mechanically mixing the salt with between about 1/20 of 1% and 3% of glycerin.

2. A process for treating salt to prevent its hardening or caking consisting of mixing evaporated vacuum pan or grainer salt having a moisture content of not more than about ¼ of 1% with an amount of glycerin between about $\frac{1}{10}$ of 1% and 1% by weight of the salt, the temperature of the salt at the time of mixing being between about 125° and 140° F.

3. A non-hardening salt consisting of a mixture of salt and glycerin, the amount of glycerin being between about 1/20 of 1% and 3% by weight of the salt.

4. A non-hardening salt consisting of a mixture of evaporated salt and glycerin the amount of glycerin being between about $\frac{1}{10}$ of 1% and 1% by weight of the salt.

5. A non-hardening evaporated vacuum pan or grainer salt containing approximately $\frac{1}{10}$ of 1% of glycerin.

6. A non-hardening smoke salt containing approximately 1% of glycerin.

MARNELL SEGURA.